United States Patent [19]
Teay

[11] Patent Number: 5,904,742
[45] Date of Patent: May 18, 1999

[54] GAS FILTERING DEVICE FOR A LIGHT GAS TANK

[75] Inventor: Jaw-Shiunn Teay, Tainan Hsien, Taiwan

[73] Assignee: Cheng-Hua Lin, Taipei, Taiwan

[21] Appl. No.: 09/005,510

[22] Filed: Jan. 12, 1998

[51] Int. Cl.⁶ .................................................. B01D 46/24
[52] U.S. Cl. ................................ 55/311; 55/355; 55/417; 55/418; 55/419; 55/420
[58] Field of Search ............................. 55/311, 355, 417, 55/418, 419, 420, 523

[56] References Cited

U.S. PATENT DOCUMENTS

| | | | |
|---|---|---|---|
| 3,979,189 | 9/1976 | Alskog | 55/418 |
| 4,032,311 | 6/1977 | Bohmrich et al. | 55/418 |
| 4,487,618 | 12/1984 | Mann | 55/418 |
| 4,726,825 | 2/1988 | Natale | 55/420 |
| 4,941,897 | 7/1990 | Vann, III | 55/420 |
| 5,193,709 | 3/1993 | Brassell | 55/420 |
| 5,266,089 | 11/1993 | Blocker | 55/417 |
| 5,433,771 | 7/1995 | Bachovchin et al. | 55/523 |
| 5,713,972 | 2/1998 | Snyder, Sr. | 55/523 |

*Primary Examiner*—Jay H. Woo
*Assistant Examiner*—Minh-Chau T. Pham

[57] ABSTRACT

A gas filtering device for a light gas tank includes a tank, a control valve, a filter, a position block and a position bolt. The control valve is combined with a center hole of the tank body and has a passageway communicating with a hollow interior of the tank, with the filter positioned under the lower end of the passageway. Thus fuel gas is filtered become pure with water and miscellaneous matters removed by the filter when it flows out, so fuel gas may burn completely, with heat energy elevated in burning.

6 Claims, 6 Drawing Sheets

GAS FILTERING DEVICE FOR A LIGHT GAS TANK

BACKGROUND OF THE INVENTION

This invention relates to a gas filtering device for a light gas tank, particularly to one combined on a tank and a filter combined under a lower end of a gas passageway in a control valve for filtering fuel gas stored in the tank when it is to be used so that water and miscellaneous matters in the fuel gas may be removed and the fuel gas may become pure to burn completely.

Common conventional gas tanks always have a control valve combined with a tank for controlling fuel gas stored therein to flow out for use. The tank is made of steel, and in cold and wet weather, moisture may penetrate into the tank to become water mixed in fuel gas. In addition, fuel filled in the tank may also contain some water and miscellaneous matters more or less. Besides, the steel tank itself may produce corrosion by oxidization, resulting in miscellaneous oxidized matters mixing in fuel stored in a tank. Then fuel gas mixed with water and miscellaneous matters produces a large quantity of carbide in burning, possible to block the nozzle of a gas appliance. In addition, it will burn with red color, with heat gain decreased naturally. So its burning is unstable, either resulting in incomplete burning or a large quantity of carbon monoxide or dioxide, giving rise to danger of a user or dying out of an oven fire.

SUMMARY OF THE INVENTION

A main purpose of the invention is to offer a gas filtering device for a light gas tank, to elevate heat energy in burning fuel gas stored in a tank.

A main feature of a first preferred embodiment of the invention is a filter provided under a passageway in a control valve for filtering fuel gas when it flows out of the control valve for use. The filter has its upper end contacting a lower end of the passageway, shaped cylindrical to have a center hole, and its lower end supported by a position block having a center hole for a position bolt to extend through the position block and the filter to combine with the inner wall of the passageway.

A main feature of a second preferred embodiment of the invention is a filter fitted in a lower chamber of a passageway in a control valve and a C-shaped clamp ring engaging an annular groove in the chamber to support the filter from falling down.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
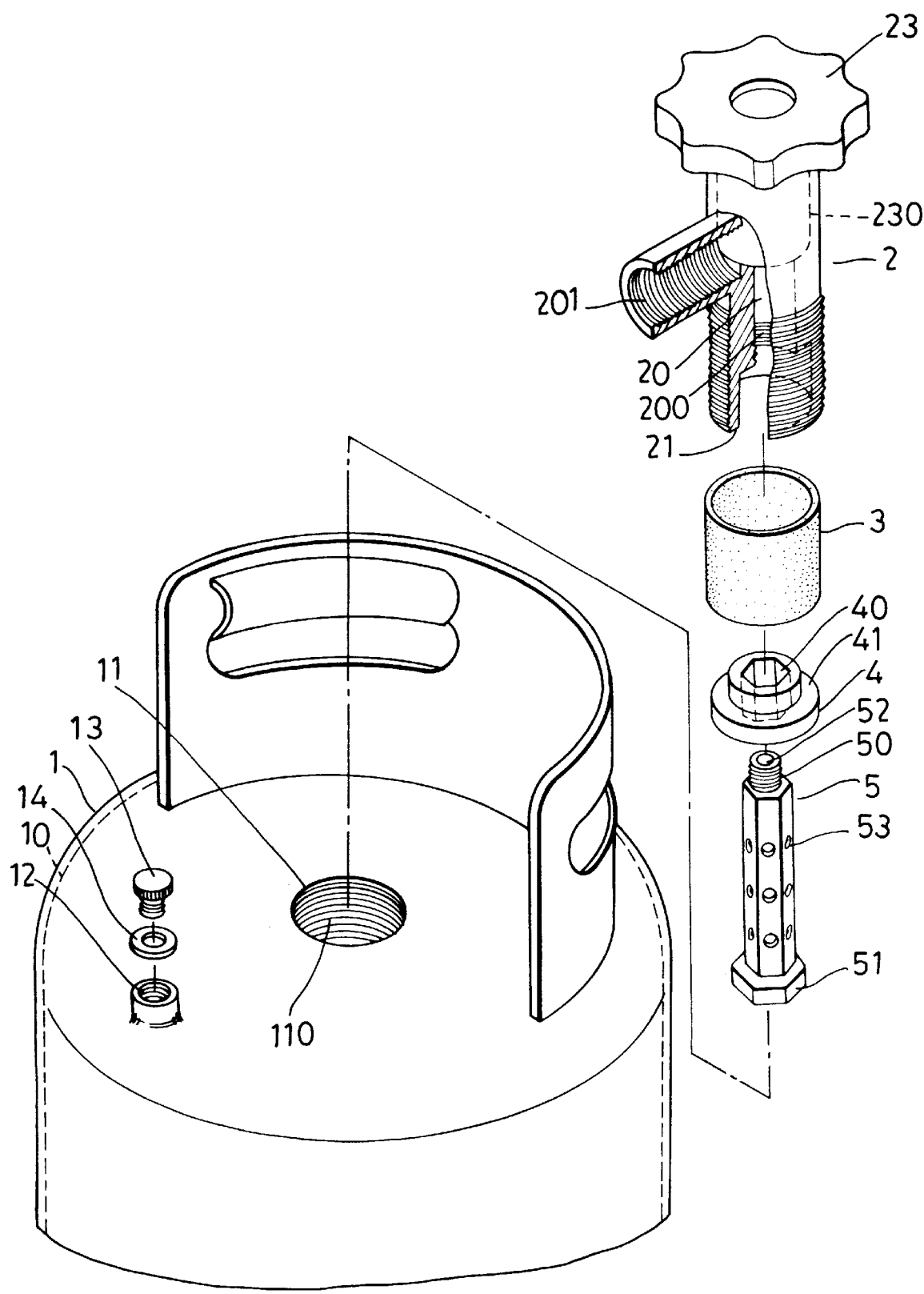
FIG. 1 is an exploded perspective view of a first preferred embodiment of a gas filtering device for a light gas tank in the present invention.

A first preferred embodiment of a gas filtering device for a light gas tank in the present invention, as shown in FIG. 1, includes a tank 1, a control valve 2, a filter 3, a position block 4, and a position bolt 5 as main components combined together.

The tank 1 has a hollow interior 10, a center through hole 11 provided in an upper side and having female threads 110 formed in the hole 11, and a gas inlet hole 12 provided also in the upper side and communicating with the hollow interior 10, and a cap 13 with a gasket 14 screwing with and closing the threaded hole 11.

The control valve 2 is combined with the center through hole 11, having a passageway 20 of an inverted L-shape provided with female threads 200 in an inner wall of a vertical portion, and female threads 201 in an inner wall of a horizontal portion, a lower flat end surface 21 provided on the vertical portion, male threads 22 provided in an outer surface of the vertical portion. A switch button 23 is combined with an upper end of the control valve 2, having a block rod 230 extending to an upper end of the vertical passageway 20 and possible to block or open the vertical portion from the horizontal portion of the passageway 20.

The filter 3, preferably cylindrical, is positioned in a lower portion of the passageway 20 of the control valve 2, having a center hollow space.

The position block 4 is positioned under the filter 3, supporting the filter 3, having a center through hole 40 and a support surface 41 formed by a lower flange.

The position bolt 5, preferably hexagonal, extends upward through the filter 3 and the position block 4 and in the lower portion of the passageway 20 of the control valve 2, having male threads 50 formed in an upper end and a head 51 formed in the lower end with a larger diameter than the inner diameter of the through hole 40 of the position block 4, a center passageway 52 opening upward and closed by the head 51, and a plurality of lateral holes 53 provided in an annular wall defining the passageway 52.

Figure 2:
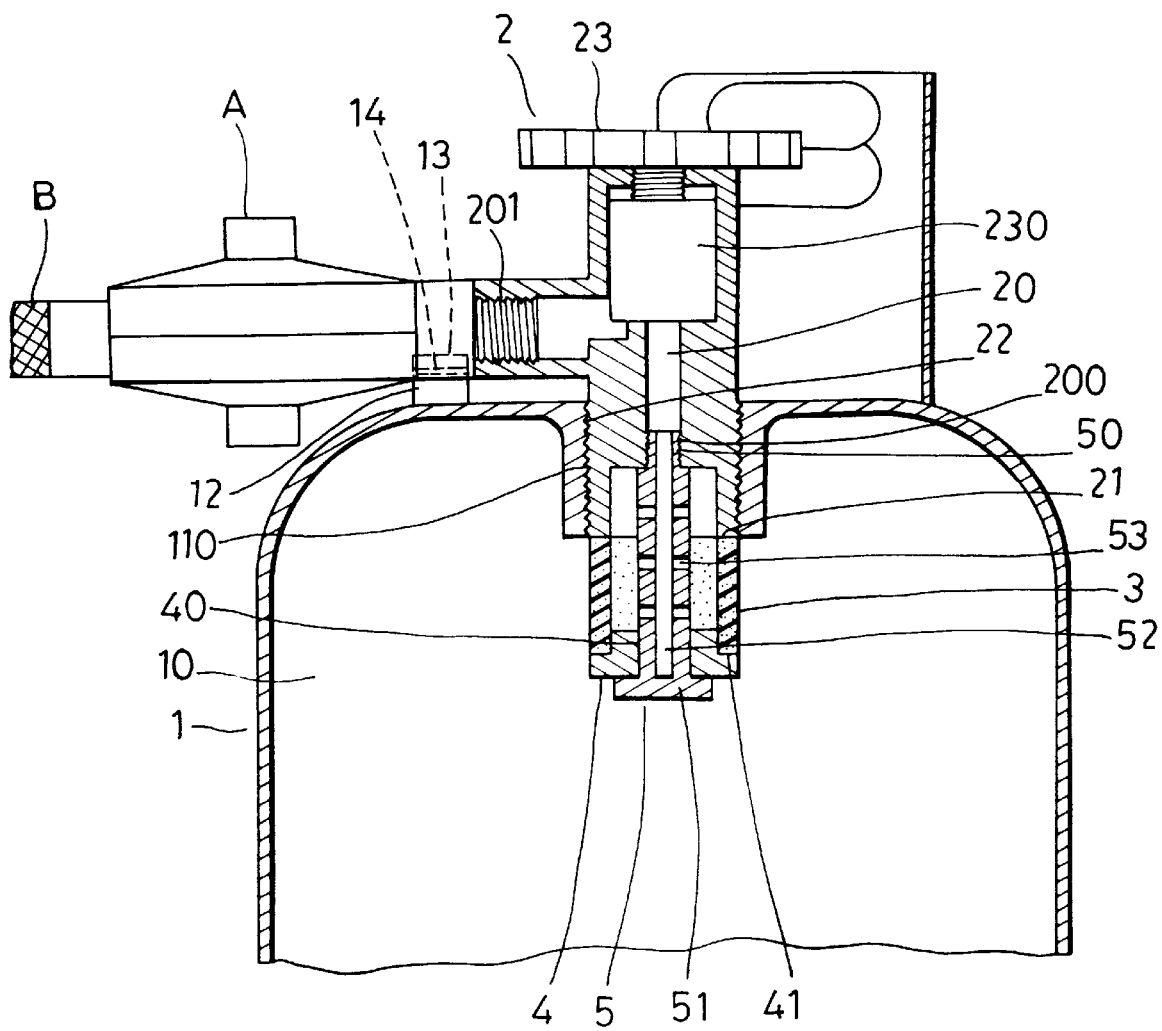
FIG. 2 is a cross-sectional view of the first preferred embodiment of a gas filtering device for a light gas tank in the present invention.

In assembling, referring to FIG. 2, firstly, the filter 3 is placed on the support surface 41 of the position block 4, and then the upper end of the position bolt 5 is inserted in the center hole 40 of the position block 4 and through the filter 3, with the head 51 contacting the bottom of the position block 4, with the upper portion of the position bolt 5 protruding upward out of the filter 3 and further extending in the passageway 20 of the control valve 2 so that the male threads 50 may engage the female threads 200. Then the upper end of the filter 3 contacts tightly with the lower flat end of the passageway 20 and its lower end contacts and is supported by the support surface 41 of the position block 4. Thus the filter 3 is sandwiched securely in place between the control valve 2 and the position lock 4. The control valve 2 combined with the filter 3 is then screwed with the center hole 11 by means of the male threads 22 engaging the female threads 110, and extends in the hollow interior 10 of the tank 1. Then an adjuster A is connected with the mouth of the horizontal portion of the passageway 20 by means of the female threads 201, and next connects with a flexible tube B of a gas appliance.

Figure 3:
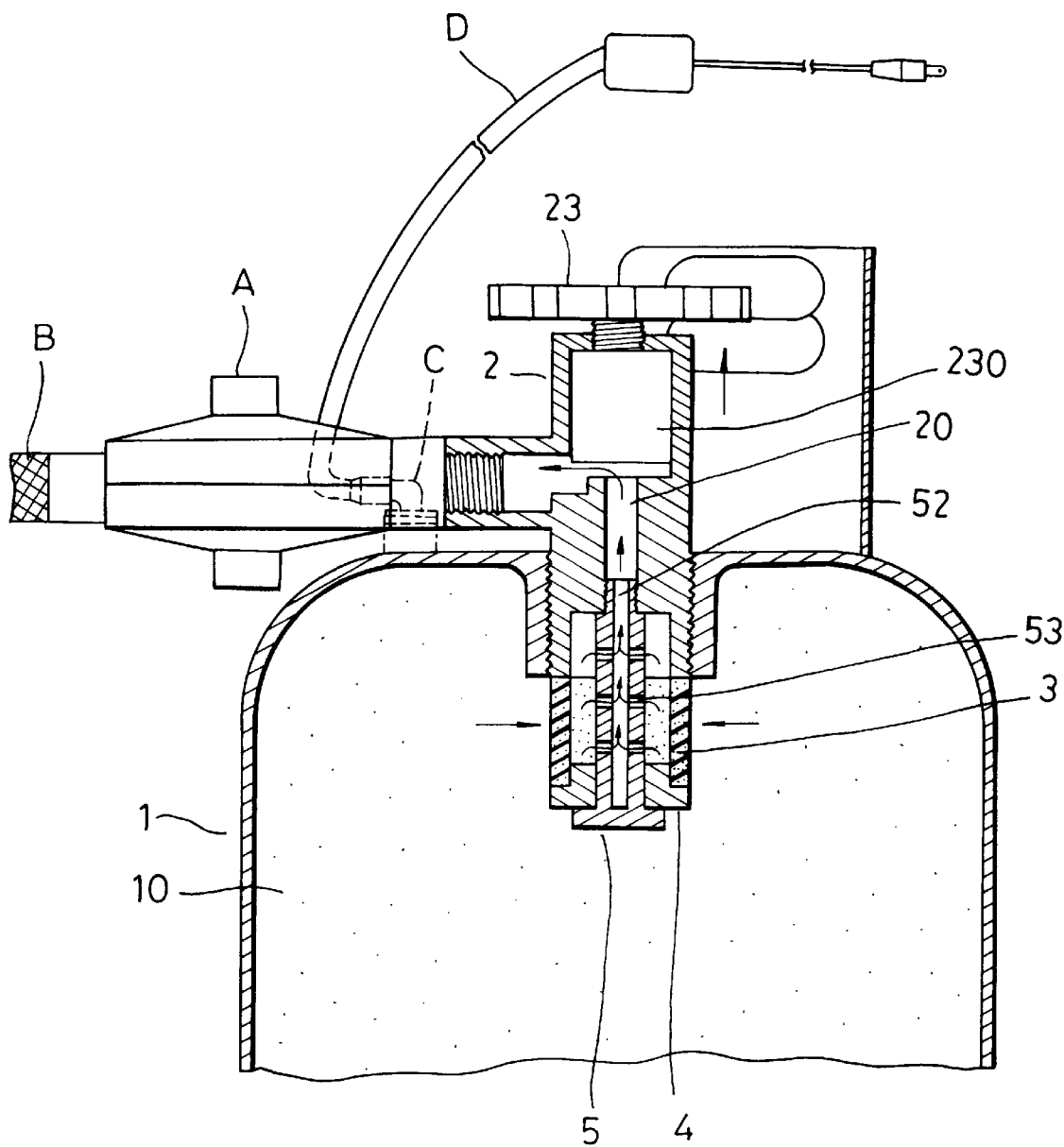
FIG. 3 is a cross-sectional view of the first preferred embodiment of a gas filtering device for a light gas tank practically used in the present invention.

In using, referring to FIG. 3, a cap 13 is taken off the inlet hole 12 and fuel is poured into the hollow interior 10. Then an inlet nozzle C with a gasket 14 is screwed with the inlet hole 12 and then connected with a pump device D so that the pump device may pump air through the nozzle C, forcing air fuse with the fuel in the tank 1 to become fuel gas. If fuel gas is to be used, the switch button 23 is rotated to rise up, forcing the block rod 230 move up, no longer blocking the horizontal portion from the vertical portion of the passageway 20. Now fuel gas can flow through the filter 3, lateral holes 53 and the center hole 52 of the position bolt 5. Then fuel gas flows into the passageway 20 of the control valve 2, the adjuster A and in the flexible tube B to be used by a gas appliance. Thus, fuel gas is filtered by the filter 3, by which water and miscellaneous matters may be removed from the fuel gas, which then may burn completely.

Figure 4:
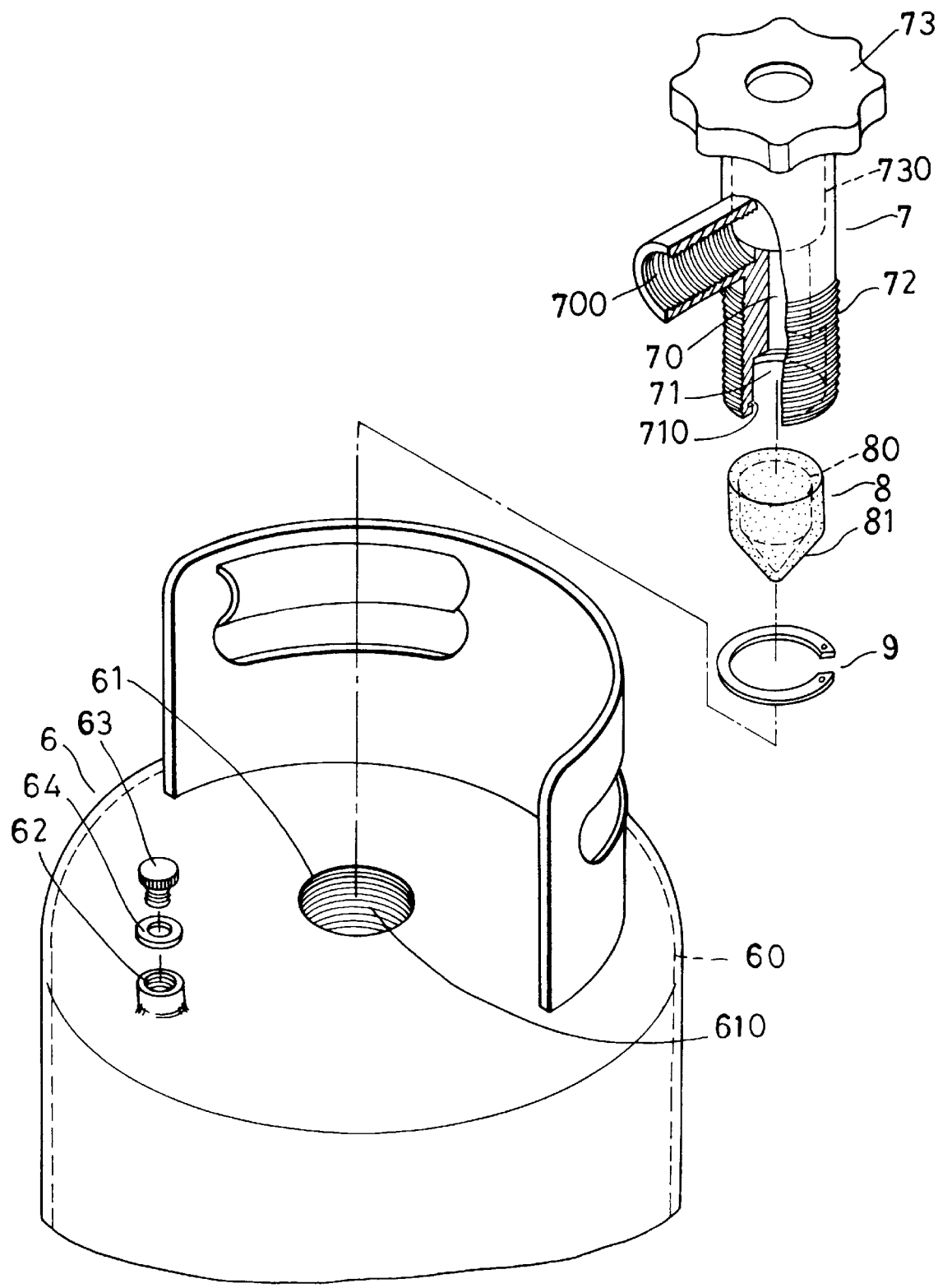
FIG. 4 is an exploded perspective view of a second preferred embodiment of a gas filtering device for a light gas tank in the present invention.

A second preferred embodiment of a gas filtering device for a light gas tank in the present invention is shown in FIG. 4, including a tank body 6, a control valve 7, a filtering material 8, and a C-shaped lamp ring 9 as main components combined together.

The tank body 6 has a hollow interior 60, a center hole 61 provided with female threads 610 in an upper side, an inlet hole 62 communicating with the hollow interior 60 also in the upper side, and a cap 63 with a gasket 64 closing threadably the inlet hole 62.

The control valve 7 engages the center hole 61, having an inverted L-shaped passageway 70, female threads 700 provided in an outer end of a horizontal portion of the passageway 70, a hollow chamber 71 formed in a lower portion of the vertical portion of the passageway 70 and opening downward, an annular groove 72 formed in an inner lower surface of the hollow chamber 71, male threads 72 formed in an outer surface of the wall of the hollow chamber 71. Then a control button 73 is mounted on the upper end of the control valve 7 and a block rod 730 extends in the control valve 7 down from the control button 73 and blocks and opens the horizontal portion from the vertical portion of the passageway by means of the control button 73 rotatable.

The filter material 8 is positioned in the hollow chamber 71 of the vertical portion of the passageway 70, having its outer diameter a little smaller than the inner diameter of the chamber 71, a cone-shaped lower portion 81 and a hollow interior 80.

The C-shaped clamp ring 9 is positioned to engage the annular groove 710 of the chamber 71 of the control valve 7.

Figure 5:
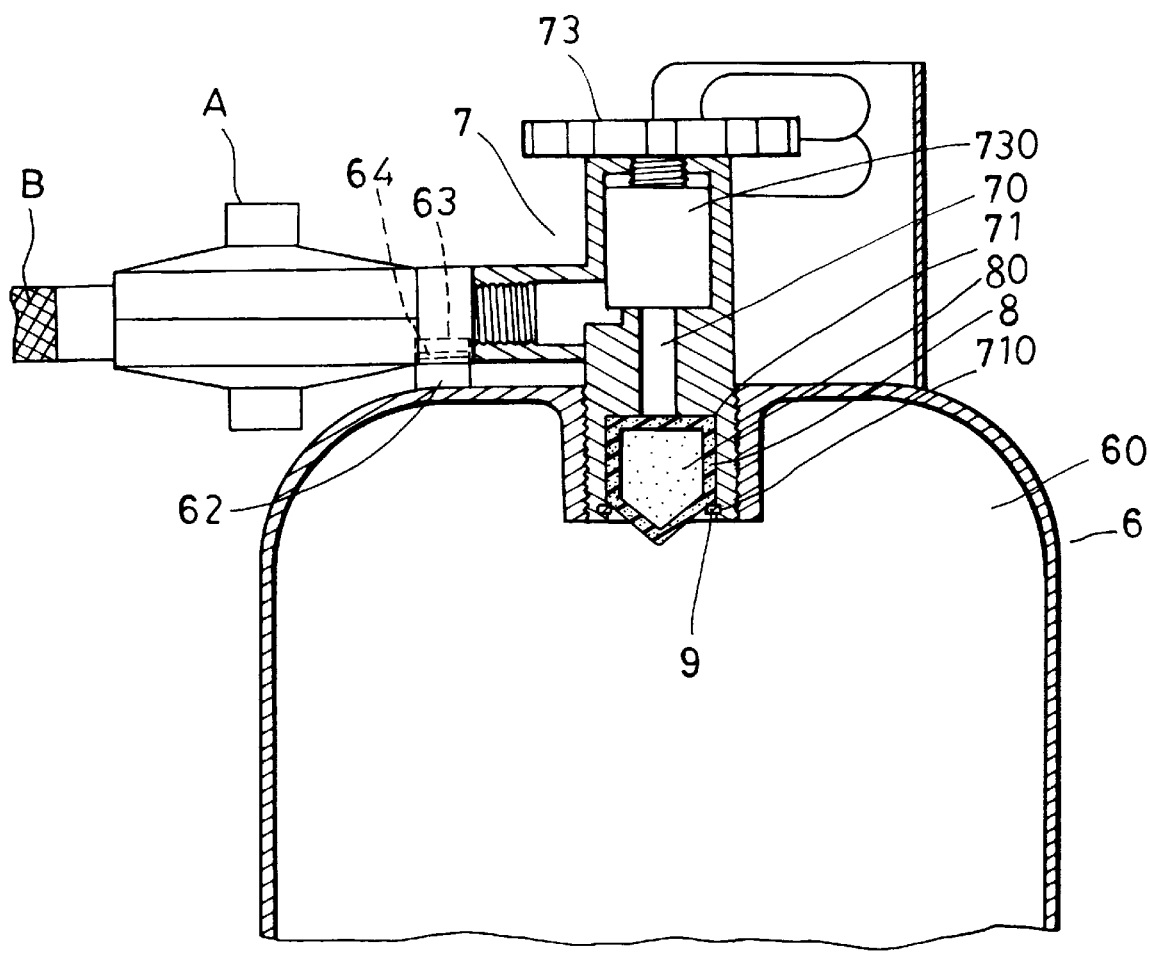
FIG. 5 is a cross-sectional view of the second preferred embodiment of a gas filtering device for a light gas tank in the present invention; and, FIG. 6 is a cross-sectional view of the second preferred embodiment of a gas filtering device for a light gas tank practically used in the present invention.

In assembling the second preferred embodiment, referring to FIG. 5, firstly, the filter material 8 is pushed upward in the chamber 71 through the open lower side, and then the C-shaped clamp ring 9 is made to engage the annular groove 710 to support the cone-shaped portion 81 of the filter 8, preventing the same 8 from falling out of the chamber 71 and securing the filter 8 with the control valve 7. Then the valve 7 combined with the filter 8 is combined with the center hole 610 of the tank body 6 to extend in the hollow interior 50, with the male threads 72 engaging the female threads 610. Next, an adjuster A is threadably combined with the female threads 701 of the horizontal portion of the passageway 70 and also connected with a flexible tube B of a gas appliance.

Figure 6:
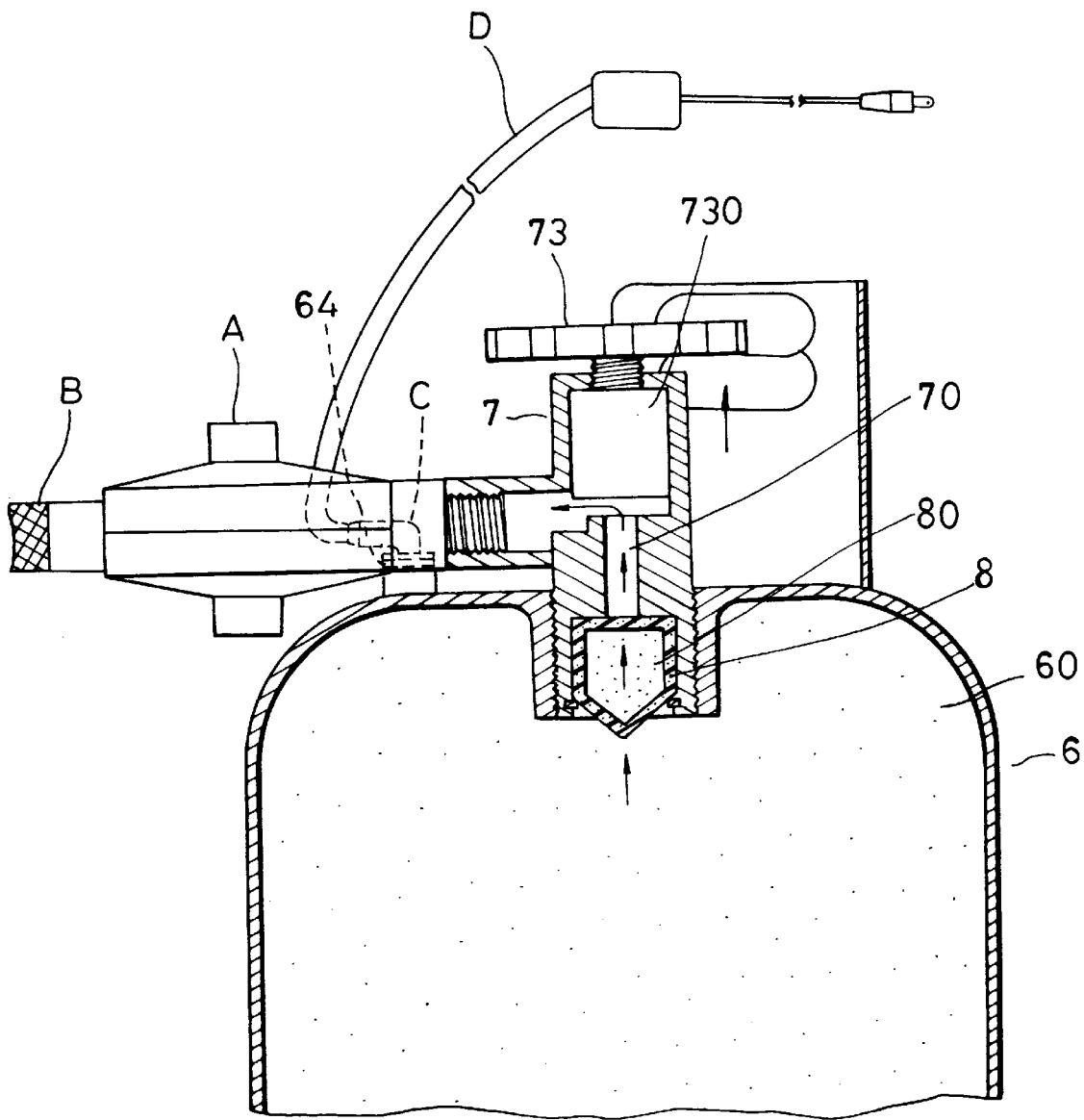

In using the second preferred embodiment, at first, the cap 63 is removed from the inlet hole 62, and fuel is poured into the hollow interior the the hole 62. Then an inlet nozzle C with a gasket 64 is threadably closed the inlet hole 62, and a pump device D is connected with the inlet nozzle C as shown in FIG. 6. Next, air is pumped into the hollow interior 60 through the nozzle C to force air fuse with fuel in the tank to become fuel gas. If fuel gas in the tank is to be used, the control button 73 is rotated to move up, with the block rod 730 also moving up and no longer blocking the horizontal portion from the vertical portion of the passageway. Then fuel gas in the tank 6 may flow through the hollow interior 80 of the filter 8, the chamber 71, the passageway 70 to the adjuster A, through the flexble tube B and finally to a gas appliance. Thus water and miscellaneous matters may be removed from fuel gas, which may burn completely, as in the first preferred embodiment.

As can be understood from the aforesaid description, the invention surely has advantages as follows:

1. Fuel gas can burn completely to elevate its heat energy, as it is filtered to remove water and miscellaneous matters before used.
2. Quantity of carbide produced may be reduced when fuel gas burns, as water and miscellaneous matters are filtered off, and may not block the burning nozzle of a gas appliance to stabilize burning.

While the preferred embodiments of the invention have been described above, it will be recognized and understood that various modifications may be made therein and the appended claims are intended to cover all such modifications which may fall within the spirit and scope of the invention.

What is claimed is:

1. A gas filtering device for a light gas tank comprising:
   a tank body having a hollow interior for storing fuel gas, and an inlet hole in an upper side:
      a control valve connected to said inlet hole of said tank body and having a gas passageway which is selectably opened and closed by said control valve;
      a filter having an upper and tightly contacting a lower end surface of a wall of said passageway of said control valve, and a hollow interior;
      a position block tightly contacting a lower end of said filter and positioning said filter, having a center through hole and a radial flange in a lower end; and
      a position bolt extending through, supporting and positioning said position block, extending through said filter and extending in and connected to said passageway of said control valve;
   whereby said filter removes water and miscellaneous matters from fuel gas stored in said tank body when said fuel gas flows out of said control valve so that filtered fuel gas is purified to burn completely, with heat energy being elevated in burning.

2. A gas filtering device for a light gas tank comprising:
   a tank body having a hollow interior for storing fuel gas, and a center hole in an upper side;
   a control valve connected to said center hole of said tank body, and having a gas passageway which is selectably opened and closed by said central valve, said passageway having a chamber in a lower portion and an annular groove in a wall defining said chamber;
   a filter contained in said chamber of said passageway and having a hollow interior; and
   a C-shaped clamp ring engaging said annular groove of said chamber, said clamp ring supporting said filter from falling out of said chamber;
   whereby said filter removes water and miscellaneous matters from fuel gas stored in said tank body when said fuel gas flows out of said control valve so that said fuel gas is purified to burn completely, with heat energy being elevated in burning.

3. The gas filtering device for a light gas tank as claimed in claim 1, wherein said passageway of said control valve has a vertical portion with female threads, said position bolt has male threads in an upper end, and said position bolt is threadably connected to said passageway of said control valve via said vertical portion.

4. The gas filtering device for a light gas tank as claimed in claim 1, wherein said position bolt has a head in a lower end, said head having a larger outer diameter than said center through hole of said position block such that said position block is supported on said head of said position bolt.

5. The gas filtering device for a light gas tank as claimed in claim 1, wherein said position bolt has a center passageway opening upward, a lower end closed by a head, and a plurality of lateral holes provided in an annular wall defining said center passageway whereby fuel gas in said tank body flows through said lateral holes into said center passageway after being filtered by said filter and then into said passageway of said control valve to be let out for use.

6. The gas filtering device for a light gas tank as claimed in claim 2, wherein said filter has a cone-shaped bottom which is supported by said C-shaped clamp ring engaging said annular groove of said chamber of said passageway of said control valve.

* * * * *